United States Patent [19]

Denker et al.

[11] Patent Number: 4,755,963

[45] Date of Patent: Jul. 5, 1988

[54] HIGHLY PARALLEL COMPUTATION NETWORK WITH MEANS FOR REDUCING THE ALGEBRAIC DEGREE OF THE OBJECTIVE FUNCTION

[75] Inventors: John S. Denker, Red Bank; Richard E. Howard; Lawrence D. Jackel, both of Holmdel, all of N.J.

[73] Assignee: American Telephone and Telgraph Company, AT&T Bell Laboratories, Murray Hill, N.J.

[21] Appl. No.: 851,234

[22] Filed: Apr. 14, 1986

[51] Int. Cl.[4] .............................................. G06F 15/46
[52] U.S. Cl. ................................... 364/807; 364/300; 364/131
[58] Field of Search ............... 364/807, 862, 602, 300, 364/131; 367/105, 901, 903

[56] References Cited

U.S. PATENT DOCUMENTS

| | | | |
|---|---|---|---|
| 4,218,768 | 8/1980 | Hassler | 367/105 |
| 4,464,726 | 8/1984 | Chiang | 364/862 |
| 4,660,166 | 4/1987 | Hopfield | 364/807 |

OTHER PUBLICATIONS

"Linear Programming on an Electronic Analogue Computer", *Trans. AIEE Part I (Comm. & Elect.)*, vol. 75, I. B. Pyne, 1956, pp. 139–143.

*Primary Examiner*—Michael R. Fleming
*Attorney, Agent, or Firm*—Henry T. Brendzel

[57] ABSTRACT

A highly interconnected analog network is constructed with inter-neurons that account for energy function terms of order greater than two. The network comprises analog amplifiers that are connected with a resistive interconnection matrix which connects each amplifier output to the input of all other amplifiers. The connections embodied in the matrix are achieved with conductances whose values are computed in accordance with the set of problem restrictions, while the cost variables of the problem which are to be minimized are incorporated in the input signals.

11 Claims, 2 Drawing Sheets

HIGHLY PARALLEL COMPUTATION NETWORK WITH MEANS FOR REDUCING THE ALGEBRAIC DEGREE OF THE OBJECTIVE FUNCTION

BACKGROUND OF THE INVENTION

This relates to apparatus for parallel processing of signals.

In spite of the tremendous computational power of digital computers, for a variety of reasons many practical problems cannot effectively be solved by the digital computer. The reason may be that a closed form solution is unavailable for the particular formulation of the problem and, therefore, numerical methods must be employed; or it may be that the number of variables in an optimization problem is large, and finding the optimum solution from the very large set of possible solutions is just too great a task to be performed by a digital computer in a reasonable time.

Heretofore, most artisans have either suffered the limitations of general purpose digital computers, or developed special purpose digital computers to solve their particular problems more efficiently. Recently, advances have brought to the forefront a class of highly parallel computation circuits that solve a large class of complex problems in analog fashion. These circuits comprise a plurality of amplifiers having a sigmoid transfer function and a resistive feedback network that connects the output of each amplifier to the input of the other amplifiers. Each amplifier input also includes a capacitor connected to ground and a resistor connected to ground. Input currents are fed into each amplifier input, and output is obtained from the collection of output voltages of the amplifiers.

A generalized diagram of this circuit is shown in FIG. 1, depicting five amplifiers (10-14) with positive and negative outputs $V_1$ and $-V_1$ on line pair 21, $V_2$ and $-V_2$ on line pair 22, $V_3$ and $-V_3$ on line pair 23, $V_4$ and $-V_4$ on line pair 24, and $V_N$ and $-V_N$ on line pair 25. Those outputs are connected to an interconnection block 20 which has output lines 40-44 connected to the input ports of amplifiers 10-14, respectively. Within interconnection block 20, each output voltage $V_i$ is connected to each and every output line of block 20 through a conductance (e.g., resistor). For convenience, the conductance may be identified by the specific output line (i.e., source) that is connected by the conductance to a specific voltage line. For example, $T_{21}{}^+$ identifies the conductance that connects the positive output $V_2$ of amplifier 11 to the input of the first amplifier (line 41).

Also connected to each amplifier input port is a resistor and a capacitor whose second lead is grounded, and means for injecting a current (from some outside source) into each input port.

Applying Kirchoff's current law to the input port of each amplifier i of FIG. 1 yields the equation:

$$C_i(du_i/dt) = -u_i/R_i + \sum_j (T_{ij}^+ - T_{ij}^-)V_j + I_i \quad (1)$$

where
$C_i$ is the capacitance between the input of amplifier i and ground,
$1/R_i$ is the equivalent resistance and it equals $$\frac{1}{\rho_i} + \sum_j \frac{1}{R_{ij}},$$

where $\rho_i$ is the resistance between the input of amplifier i and ground,
$u_i$ is the voltage at the input of amplifier i,
$T_{ij}{}^+$ is the a conductance between the positive output of amplifier j and the input of amplifier i,
$T_{ij}{}^-$ is the a conductance between the negative output of amplifier j and the input of amplifier i,
$V_j$ is the positive output voltage of amplifier j, and
$I_i$ is the current driven into the input port of amplifier i by an external source.

When $T_{ij}{}^+$ and $T_{ij}{}^-$ are disjoint, $T_{ij}{}^+ - T_{ij}{}^-$ may for convenience be expressed as $T_{ij}$, and it is well known that a circuit satisfying Equation (1) with symmetric $T_{ij}$ terms is stable. It is also well known that such a circuit responds to applied stimuli, and reaches a steady state condition after a short transition time. At steady state, $du_i/dt=0$ and $dV_i/dt=0$.

With this known stability in mind, the behavior of other functions may be studied which relate to the circuit of FIG. 1 and involve the input signals of the circuit, the output signals of the circuit, and/or the circuit's internal parameters.

Indeed, in a copending application entitled Optimization Network for the Decompositon of Signals, by J. J. Hopfield, a function was studied that has the form $$E = -\tfrac{1}{2} \sum_i \sum_j T_{ij}V_iV_j + \sum_i (1/R_i) \int_0^{V_1} g_i^{-1}(V)dV - \sum_i I_iV_i. \quad (2)$$

It is observed in this copending application that the integral of the function $g_i{}^{-1}(V)$ approaches 0 as the gain of amplifier i approaches infinity. It is also shown in the Hopfield application that the time derivative of the function E is negative, and that it reaches 0 when the time derivative of voltages $V_i$ reaches 0. Since equation (1) assures the condition of $dV_i/dt$ approaching 0 for all i, the function E of equation (2) is assured of reaching a stable state. The discovery of this function E led to the use of the FIG. 1 circuit in problem solving applications (such as the classic traveling salesman problem), in associative memory applications, and in decomposition problems (as disclosed in another copending application, by J. J. Hopfield and D. W. Tank, titled Optimization Network for the Decomposition of Signals).

The FIG. 1 circuit can solve the above classes of problems when those problems are structured so that the minimization of a function having at most second order terms in some parameters of the problem resuls in the desired solution. Other problems, however, may require the minimization of equations that contain terms of order higher than two. Those may be problems that perhaps can otherwise be stated with second order terms, but the statement with higher order terms is more meaningful, or they may be problems that can only be described with the use of higher order terms.

It is the object of this invention, therefore, to obtain solutions for problems characterized by higher order terms with a highly parallel circuit not unlike the circuit of FIG. 1.

SUMMARY OF THE INVENTION

These and other objects are achieved with a highly interconnected analog network that is constructed with inter-neurons that account for terms of order greater than two. The network comprises analog amplifiers that are connected with a resistive interconnection matrix which, like the prior art network, connects each amplifier output to the input of all other amplifiers. The connections embodied in the matrix are achieved with conductances whose values are computed in accordance with the set of problem restrictions, while the cost variables of the problem which are to be minimized are applied as input signals.

DETAILED DESCRIPTION

Figure 1:
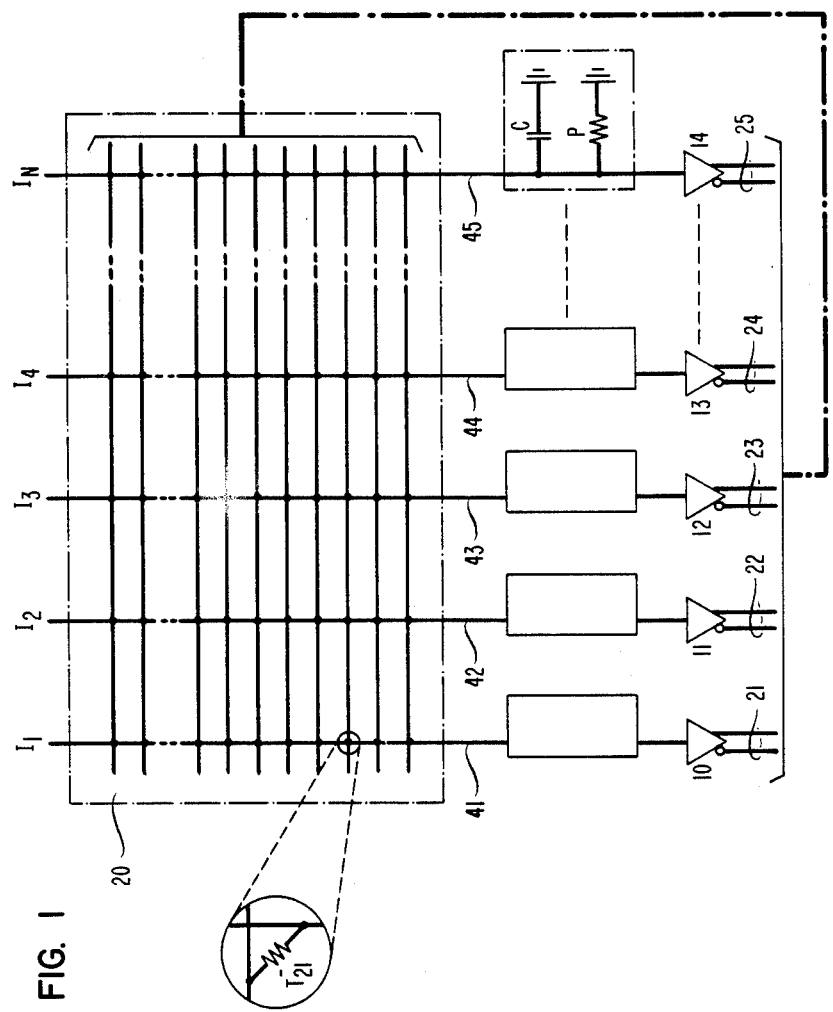
FIG. 1 describes the prior art highly interconnected analog network.

The principles of our invention may be more fully understood and appreciated when applied to a specific problem and, to that end, the following detailed description presents the best mode for constructing a highly parallel computation circuit for solving a minimization problem characterized by an equation that has terms of order greater than two.

For purposes of illustration, the problem selected is the classic routing problem, such as encountered in the airline industry. In such a problem there may be N points where stops can be made (e.g., cities), and there is a cost associated with traveling from one point to the next. The object is to find a path in conformance to the rules of the problem at hand which connects a given origin point with a specific destination point at a minimum attendant overall cost.

One way to solve this problem is to construct a cost function that describes the desired attributes of the final solution, and to select the variables of that function so that the cost is minimized. Equation (3) below is one such cost function $$E = \sum_A \sum_B c_{AB} V_{AB} \qquad (3)$$

where $V_{AB}$ represents a link from point (city) A to point (city) B, and $c_{AB}$ represents the direct cost associated with taking link AB. The presence or absence of link AB in the solution is indicated by $V_{AB}$ either taking on the value 1 or 0, respectively, and thus, the terms $c_{AB} \cdot V_{AB}$ combine to represent the overall direct cost of taking a particular route. A specification that a particular link may not be present in the solution tour is accomplished by assigning a high cost factor $c_{AB}$ to the impermissible link.

In a routing problem of N points, each point may have a link to all other points and, hence, at most (N)(N−1) links can exist. This number corresponds to the number of terms in Equation (3) and is equal to the number of direct cost terms in Hopfield's model. It may be noted that since it is links that are considered rather than cities, the V terms herein are characterized by two subscripts rather than one. Consequently, we might expect that terms which otherwise correspond to the $T_{ij}$ terms found in Equation (2) would appear with four subscripts, e.g., $T_{ijkl}$. Also, the summations performed would be over four indices rather than two.

Although the Equation (3) cost function describes the direct cost of a tour, in itself it is not sufficient to insure that a *valid* solution would be found to the tour minimization problem. For example, Equation (3) clearly permits a tour specification of a link DE followed by a link DF, but links DE and DF emanate from the same point (D) and cannot follow each other. This is an "outgoing branch" condition. Since the "outgoing branch" condition is unacceptable in the final solution, we discourage it by adding the penalty function $$E_1 = \lambda_1 \sum_A \sum_B V_{AB} \sum_C V_{AC} \qquad (4)$$

to the overall cost function of Equation (3). Equation (3) says, in essence, that a traversal from A to B followed by a traversal from A to B shall be very costly ($\lambda$ is large).

A corollary to the "outgoing branch" condition is the "incoming branch" condition, where more than one link is chosen to reach a certain point. This unwanted condition is discouraged by adding the penalty function $$E_2 = \lambda_2 \sum_A \sum_B V_{AB} \sum_C V_{CB} \qquad (5)$$

to the overall cost function of Equation (3).

The terms contributed by Equations (4) and (5) are similar to the first term in Equation (2), in that the variable V appears in the second degree, and so those terms present no problem in the realization of a circuit to minimize the cost function resulting from combining Equations (3), (4), and (5). However, preventing the "outgoing branch" and "incoming branch" conditions may not be sufficient.

A further consideration of Equation (3) relates to the selection of some links and the non-selection of some other possible links. When one visualizes the physical problem, it is readily apparent that having taken one link to reach a point A, some link emanating from point A must also be taken; otherwise the tour cannot properly be completed. Stated in other words, having taken a certain link and having *not* taken one of a number of other links would not comport with a valid solution to the physical problem. Conversely, a solution where a link is taken from a point A but no link is taken to reach point A also does not comport with a physically realizable solution to the problem. This continuity requirement applies to all points of the tour, save for the starting (origin) point, $\alpha$, and the end (destination) point, $\omega$. At those points we wish *not* to discourage the breaking of continuity, and in fact we wish to encourage it. Accordingly, an additional function is constructed and added to the overall cost function of Equation (3), which considers each link AB and imposes penalties for certain conditions at points A and B. That function (discussed in detail below) is $$E_3 = \lambda_3 \sum_{AB \neq \omega} \sum_c V_{AB} \pi \overline{V_{BC}} + \lambda_4 \overline{\sum V_{A\omega}} + \lambda_5 \sum V_{\omega C} + \qquad (6)$$

$$\lambda_6 \sum_{A \neq \alpha B} \sum_c V_{AB} \pi \overline{V_{CA}} + \lambda_7 \overline{\sum V_{\alpha B}} + \lambda_8 \sum V_{C\alpha}$$

where the first three terms concern themselves with continuity at point B, and the last three terms concern themselves with continuity at point A.

With respect to Point B, as long as it is not the end point, ω, the desired solution must include a link from point B to some point C. Accordingly, the first term in Equation (6) imposes a penalty for not including a link from point B to some point C. Stated in other words, a penalty $\lambda_3$ is imposed when a link AB is taken AND a link BC (where C is any other point) is not taken. The product operator Π performs the logic AND function and, hence, when a link BC is taken, the resulting product is zero and penalty $\lambda_3$ is not imposed. When B is the destination point, however, the first term imposes no penalties, but the second term imposes a penalty for not entering ω, and the third term imposes a penalty for exiting ω.

With respect to point A, as long as it is not the starting point, α, the desired solution must include a link from some point C to point A. Accordingly, the fourth term in Equation (6) imposes a penalty for not including a link from some point C to point A. When point A is the starting point, however, the fourth term imposes no penalties, but the fifth term imposes a penalty for not exiting α, and the sixth term imposes a penalty for entering α.

There are two situatons that may occur where continuity is maintained but it is undesirable. These are when a "stand still" path is taken, such as $V_{AA}$, and when a "backtrack" path is taken, such as $V_{AB}$ followed by $V_{BA}$. These undesirable situations are penalized with function $E_4$ that has the form $$E_4 = \lambda_9 \sum_A V_{AA} + \lambda_{10} \sum_A \sum_B V_{AB} V_{BA}. \quad (7)$$

Utilizing the equality $$\sum_{A \neq B} V_{AC} = \sum_A V_{AC} - V_{BC}, \quad (8)$$

the cost function which combines Equations (3) through (7) equals to the following:

$$E = \sum_A \sum_B \left[ c_{AB} V_{AB} + \lambda_1 \sum_C V_{AB} V_{AC} + \lambda_2 \sum_C V_{AB} V_{CB} \right] + \quad (9)$$

$$\sum_A \sum_B \left[ \lambda_3 V_{AB} \pi \overline{V_{BC}} + \lambda_6 V_{AB} \pi \overline{V_{CA}} \right] -$$

$$\Sigma \lambda_3 V_{A\omega} \pi \overline{V_{\omega C}} - \Sigma \lambda_6 V_{\alpha B} \pi \overline{V_{C\alpha}} +$$
$$A \qquad C \qquad\qquad B \qquad C$$

$$\lambda_4 \sum_A \overline{V_{A\omega}} + \lambda_5 \sum_C V_{\omega C} + \lambda_7 \sum_B \overline{V_{\alpha B}} +$$

$$\lambda_8 \sum_{V_{C\alpha}} \sum_C V_{C\alpha} + \lambda_9 \sum_A V_{AA} + \lambda_{10} \sum_A \sum_B V_{AB} V_{BA}.$$

Equation (9) represents a valid and useful statement of the overall cost function of the routing problem. Unfortunately, the terms having the product operator Π are approximately in the $N^{th}$ degree of the variable V. The overall cost function is therefore not of the form described in the aforementioned copending applications, and it would appear that this overall cost function cannot be mapped onto the circuit of FIG. 1 as described by the prior art. We discovered a way to restructure the problem and make it solvable with a circuit akin to the circuit of FIG. 1.

In solving the minimization problem in accordance with Equation (2), the FIG. 1 circuit develops an output voltage for each V term and, when the circuit reaches steady state, these voltages assume either the value 1 or 0. Realizing that the product terms $$\left( e.g., \pi V_{BC} \atop C \right)$$

are also restricted in the steady state to 0 or 1, we replace terms of the form $$\pi V_{BC} \atop C$$

with single variables of the form $V_{Bout}$ and the term $$\pi V_{CA} \atop C$$

with the single variable $V_{inA}$. This yields a cost function equaton that has terms with V variables only in the first or second degree. On first blush this process of replacement appears to be merely form over substance; but that is not the case, as shown below.

We call the $V_{Bout}$ and $V_{inA}$ terms inter-neurons which, in their steady state, are either 1 (turned on) or 0 (turned off). Whatever state the inter-neurons assume, however, they must satisfy their definitional equality; and this imperative may be incorporated in the overall cost function by assigning a penalty for failing to satisfy the equality. Employing De Morgan's theorem offers the identity $$\pi \overline{V_{XY}} = \overline{\Sigma V_{XY}} \atop Y \qquad Y$$

and in our application where the final state of an inter-neuron is either 1 or 0, $$\overline{\sum_Y x_{xy}}$$

is also equal to $$1 - \sum_Y V_{XY}.$$

Employing the above, an additional cost function to be included in the overall cost function can be created which introduces the concept of a penalty for failure to satisfy the definitional requirement of inter-neurons. Specifically, the term $$\pi \overline{V_{BC}} \atop C$$

in Equation (9) is replaced with $V_{Bout}$ and the cost term $$\lambda_{11}\left(V_{Bout} + \sum_C V_{BC} - 1\right)^2$$

is added. Similarly, the term $$\frac{\pi \overline{V_{CA}}}{C}$$

in Equation (9) is replaced with $V_{inA}$ and the cost term $$\lambda_{12}\left(V_{inA} + \sum_C V_{CA} - 1\right)^2$$

is added. Finally, the term $$\overline{\sum_A V_{A\omega}}$$

is replaced with $$1 - \sum_A V_{A\omega},$$

and the term $$\overline{\sum_B V_{\alpha B}}$$

is replaced with $$1 - \sum_B V_{\alpha B}.$$

Combining the above cost functions yields the final overall cost function:

$$E = \sum_A \sum_B \left[ c_{AB} V_{AB} + \lambda_1 \sum_C V_{AB} V_{AC} + \lambda_2 \sum_C V_{AB} V_{CB} \right] + \quad (10)$$

$$\sum_A \sum_B [\lambda_3 V_{AB} V_{Bout} + \lambda_6 V_{AB} V_{inA}] - \sum_A \lambda_3 V_{A\omega} V_{\omega out} - \sum_B \lambda_6 V_{\alpha B} V_{ina} +$$

$$\lambda_4 \left(1 - \sum_A V_{A\omega}\right) + \lambda_5 \sum_C V_{\omega C} + \lambda_7 \left(1 - \sum_B V_{\alpha B}\right) +$$

$$\lambda_8 \sum_C V_{C\alpha} + \lambda_9 \sum_A V_{AA} + \lambda_{10} \sum_A \sum_B V_{AB} V_{BA} +$$

$$\lambda_{11} \sum_B \left(V_{Bout} + \sum_C V_{BC} - 1\right)^2 + \lambda_{12} \sum_A \left(V_{inA} + \sum_C V_{CA} - 1\right)^2.$$

Equation (10) has the general form of Equation (2) in that it has terms in V only of the first degree and of the second degree. It differs from Equation (2) only in that the terms don't all appear as summations over four indices. That can be remedied, however, in a straightforward manner. For example, the term $$\sum_A \sum_B \sum_C \lambda_i V_{AB} V_{AC}$$

can be converted to $$\sum_i \sum_j \sum_k \sum_l \lambda_1 \delta_k^i V_{ij} V_{kl}$$

(or rewritten in a simpler form as $$\sum_{i,j,k,l} \lambda_1 \delta_k^i V_{ij} V_{kl}),$$

where $\delta_k^i$ is a function whose value is 1 when $k=i$, and 0 otherwise. In addition to the introduction of the $\delta$ function, the above makes a simple variable transformation to reduce confusion.

The above procedure can be applied to each and every term in Equation (10), yielding the table:

TABLE $$\sum_{A,B} c_{AB} V_{AB} \rightarrow \sum_{i,j} c_{ij} V_{ij}$$

$$\sum_{A,B,C} \lambda_1 V_{AB} V_{AC} \rightarrow \sum_{i,j,k,l} \lambda_1 \delta_k^i V_{ij} V_{kl}$$

$$\sum_{A,B,C} \lambda_2 V_{AB} V_{CB} \rightarrow \sum_{i,j,k,l} \lambda_2 \delta_l^j V_{ij} V_{kl}$$

$$\sum_{A,B} \lambda_3 V_{AB} V_{Cout} \rightarrow \sum_{i,j,k,l} \lambda_3 \delta_k^j \delta_l^{out} V_{ij} V_{kl}$$

$$\sum_A (-\lambda_3) V_{A\omega} V_{\omega out} \rightarrow \sum_{i,j,k,l} (-\lambda_3) \delta_j^j \delta_l^\omega \delta_l^{out} V_{ij} V_{kl}$$

$$\sum_{A,B} \lambda_6 V_{AB} V_{inA} \rightarrow \sum_{i,j,k,l} \lambda_6 \delta_l^j \delta_k^{in} V_{ij} V_{kl}$$

$$\sum_B (-\lambda_6) V_{\alpha B} V_{ina} \rightarrow \sum_{i,j,k,l} (-\lambda_6) \delta_i^j \delta_l^\alpha \delta_k^{in} V_{ij} V_{kl}$$

$$\lambda_4 \rightarrow \lambda_4$$

$$\sum_A (-\lambda_4) V_{A\omega} \rightarrow \sum_{i,j} (-\lambda_4) \delta_j^\omega V_{ij}$$

$$\sum_C \lambda_5 V_{\omega C} \rightarrow \sum_{ij} \lambda_5 \delta_i^\omega V_{ij}$$

$$\lambda_7 \rightarrow \lambda_7$$

$$\sum_B (-\lambda_7) V_{\alpha B} \rightarrow \sum_{ij} (-\lambda_7) \delta_i^\alpha V_{ij}$$

$$\sum_C \lambda_8 V_{C\alpha} \rightarrow \sum_{i,j} \lambda_8 \delta_j^\alpha V_{ij}$$

$$\sum_A \lambda_9 V_{AA} \rightarrow \sum_{i,j} \lambda_9 \delta_j^i V_{ij}$$

$$\sum_{AB} \lambda_{10} V_{AB} V_{BA} \rightarrow \sum_{i,j,k,l} \lambda_{10} \delta_k^j \delta_l^i V_{ij} V_{kl}$$

$$\sum_B \lambda_{11} \left[ (V_{Bout} - 1) \sum_C V_{BC} \right]^2$$

$$\sum_B \lambda_{11} V_{Bout} V_{Bout} \rightarrow \sum_{i,j,k,l} \lambda_{11} \delta_k^i \delta_j^{out} V_{ij} V_{kl}$$

$$\sum_B \lambda_{11}(-2) V_{Bout} \rightarrow \sum_{i,j} (-2\lambda_{11}) \delta_j^{out} V_{ij}$$

$$\sum_B \lambda_{11} \rightarrow \sum \lambda_{11} \delta^j$$

$$\sum_{B,C} 2\lambda_{11} V_{Bout} V_{BC} \rightarrow \sum_{i,j,k,l} 2\lambda_{11} \delta_k^i \delta_j^{out} V_{ij} V_{k,l}$$

-continued $$\sum_{BC}(-2\lambda_{11})V_{BC} \rightarrow \sum_{i,j}(-2\lambda_{11})V_{i,j}$$

$$\sum_{BCC'}\lambda_{11}V_{BC}V_{BC} \rightarrow \sum_{i,j,k,l}\lambda_{11}\delta_k^i V_{i,j}V_{k,l}$$

$$\sum_{A}\lambda_{12}\left[(V_{inA}-1)+\sum_{C}V_{CA}\right]^2$$

$$\sum_{A}\lambda_{12}V_{inA}V_{inA} \rightarrow \lambda_{12}\delta_i^{in}\delta_k^i\delta_j^l V_{i,j}V_{k,l}$$

$$\sum_{A}-2\lambda_{12}V_{inA} \rightarrow -2\lambda_{12}\delta_i^{in}V_{i,j}$$

$$\sum_{A}+\lambda_{12} \rightarrow \Sigma\lambda_{12}$$

$$\sum_{A_1C}2\lambda_{12}V_{inA}V_{CA} \rightarrow \sum_{i,j,k,l}2\lambda_{12}\delta_i^{in}\delta_j^l V_{i,j}V_{k,l}$$

$$\sum_{AC}-2\lambda_{12}V_{CA} \rightarrow \sum_{i,j}-2\lambda_{12}V_{i,j}$$

$$\sum_{ACC'}\lambda_{12}V_{CA}V_{CA} \rightarrow \sum_{i,j,k,l}\lambda_{12}\delta_j^l V_{i,j}V_{k,l}$$

which may be written as $$E = \sum_{i,j} I_{ij} V_{ij} + \sum_{i,j,k,l} T_{ijkl} V_{ij} V_{kl} + K \quad (11)$$

where $$I_{ij} = [C_{ij} - \lambda_4\delta_j^\omega + \lambda_5\delta_i^\omega - \lambda_7\delta_i^\alpha + \lambda_8\delta_j^\alpha +$$

$$\lambda_9\delta_j^i - 2\lambda_{11}\delta_j^{out} - 2\lambda_{11} - 2\lambda_{11}\delta_i^{in} - 2\lambda_{12}]$$

$$T_{ijkl} = [\lambda_1\delta_k^i + \lambda_2\delta_l^j + \lambda_3\delta_k^j\delta_l^{out} - \lambda_3\delta_k^j\delta_l^{out}\delta_j^\omega +$$

$$\lambda_6\delta_l^i\delta_k^{in} - \lambda_6\delta_l^i\delta_k^{in}\delta_l^\alpha + \lambda_{10}\delta_k^j\delta_l^j + \lambda_{11}\delta_k^i\delta_j^j\delta_l^{out} +$$

$$2\lambda_{11}\delta_k^j\delta_l^{out} + \lambda_{11}\delta_k^i + \lambda_{12}\delta_i^{in}\delta_k^j\delta_l^j + 2\lambda_{12}\delta_i^{in}\delta_l^j + \lambda_{12}\delta_l^j], \text{ and}$$

$$K = \lambda_7 + \sum_i (\lambda_{11} + \lambda_j^i).$$

A perusal of Equations (10) and (11) reveals that the terms corresponding to the $I_{ij}$ coefficients contain the direct cost factors ($c_{ij}$) of the problem, and $\lambda$ and $\delta$ terms. The $T_{ijkl}$ coefficients comprise $\lambda$ and $\delta$ terms. The $\delta$ and $\lambda$ terms define the ever-present restrictions on valid solutions for the type of problem described, and hence the mapping of those terms onto the $T_{ij}$ elements of Equation (2) leads to the advantageous result that a highly parallel computation circuit can be constructed with feedback terms $T_{ij}$ being independent of the specific routing problem to be solved.

Figure 2:
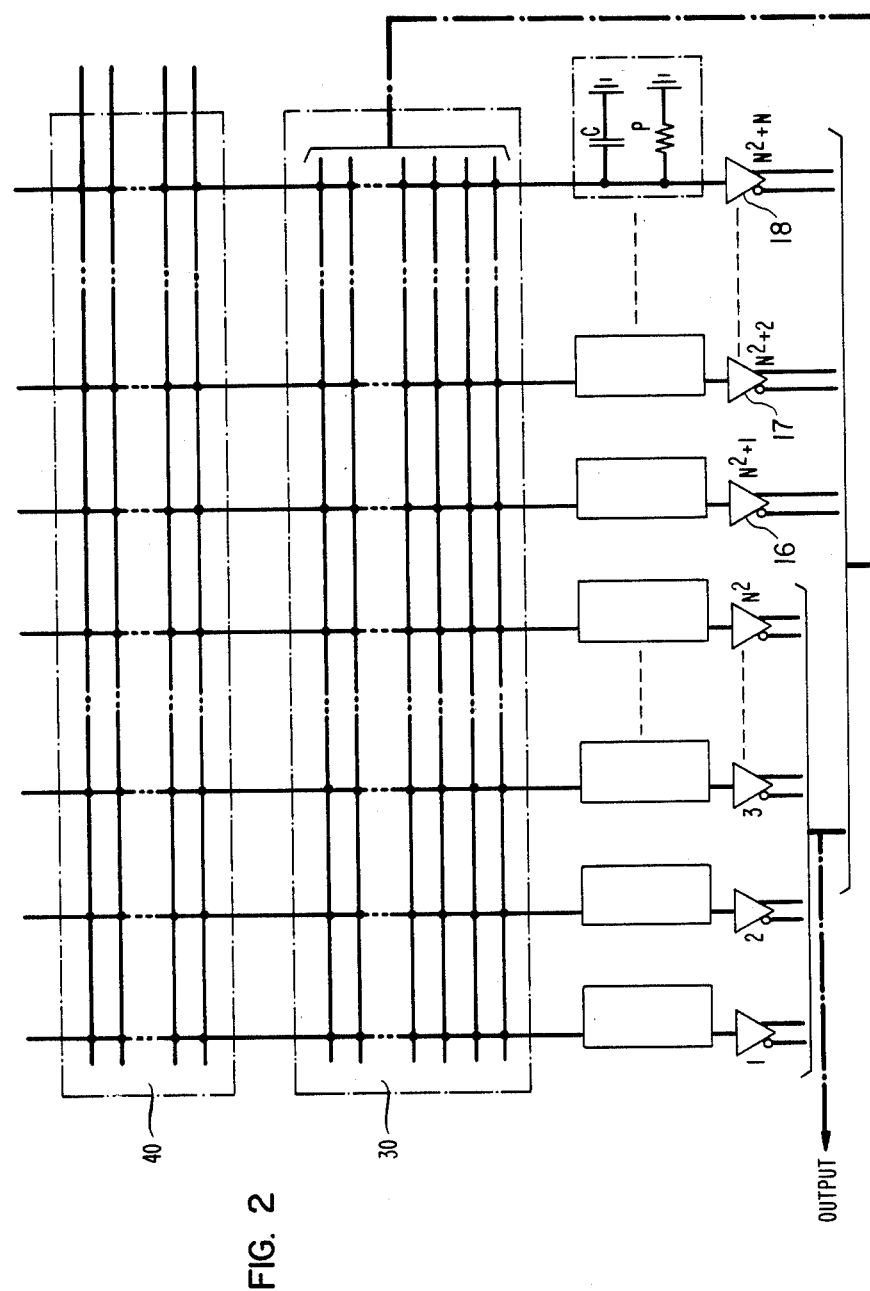
FIG. 2 describes a network constructed in accordance with the principles of our invention.

FIG. 2 depicts a circuit that attains a minimum for the cost function of Equations (10) and (11). It is similar to the FIG. 1 circuit in that there are output voltages $V_1$, $V_2$, ... $V_{N^2}$ (obtained from corresponding amplifiers) and an interconnection block 30 that connects those output voltages to the various input ports of the amplifiers. It differs, however, in that additional amplifiers are provided that develop the inter-neuron outputs $V_{N^2+1}$, $V_{N^2+2}$, ... $V_{N^2+2N}$, and those, too, are connected to interconnection block 30. In this manner the inter-neurons affect the output voltages, and the output voltages affect the inter-neurons to insure that the inter-neurons follow their definitional equality, causing the overall cost function (10) to be minimized. FIG. 2 also includes a network 40 which implements the connections embodied in the coefficient of the $I_{ij}$ term of Equation (11). Evaluation of the $I_{ij}$ and $T_{ijkl}$ terms of Equation (11) for a particular routing problem yields the actual conductance values in the feedback matrices of FIG. 2.

The above describes a very specific example of a system where the energy to be minimized is expressed in terms of output signal products of degree greater than two. Because of the specific nature of the illustrative example, the resulting equations (10 and 11) are rather long and somewhat complex. So as not to overlook the forest for the trees, it is reiterated here that our concept of inter-neurons is applicable whenever the energy function has a term that contains a product such as $$V_{AB} \pi_C \overline{V_{CA}} \text{ or } V_{AB} \pi_D \overline{V_{CD}}.$$

In accordance with our invention, the first of these terms converts to $V_{AB}V_{inA}$ and a penalty term of the form $$\lambda\left(V_{inA} + \sum_C V_{CA} - 1\right)^2$$

is added to the energy function. Similarly, the second of these terms converts to $V_{AB}V_{Cout}$ and the penalty of the form $$\lambda\left(V_{Cout} + \sum_D V_{CD} - 1\right)^2$$

is added to the energy function. Introduction of the $V_{inA}$ and $V_{Cout}$ terms corresponds to the inclusion of an input inter-neuron and an output inter-neuron, respectively; and that translates to an additional active element in the system that implements the energy minimization process. The feedback matrix that connects the output of each amplifier to the input of all amplifiers, expressed as $$\sum_{i,j,k,l} T_{ijkl}V_{ij}V_{kl},$$

is augmented for each input inter-neuron with a term of the form $$\sum_{i,j,k,l} [\delta_j^i\delta_k^{in} + \lambda\delta_i^{in}\delta_k^i\delta_j^j + 2\lambda\delta_i^{in}\delta_j^j + \lambda\delta_j^j]$$

and is augmented for each output inter-neuron with a term of the form $$\sum_{i,j,k,l} [\delta_k^j\delta_l^{out} + \lambda_k^j\delta_l^j\delta_j^j + 2\lambda\delta_k^j\delta_j^j + \lambda\delta_k^i].$$

The matrix that provides input currents to the amplifiers is augmented in a similar fashion as shown in Equation (11).

Of course other index patterns in the higher order product terms of the energy function would yield somewhat different augmentation terms to the $V_{ijkl}$ matrix and to the $I_{ij}$ matrix; but those variations are clearly within the contemplation of our invention.

Expressing the principles of our invention in even broader terms, whenever the energy function has terms of order greater than two, such as $V_u \cdot V_w \cdot V_x \cdot V_y \cdot V_z \ldots$. In accordance with our invention, such terms are converted to $V_u \cdot V_m$, where each $V_m$ is a new inter-neuron term, and a penalty term of the form $\lambda[V_m + (-1 + \overline{V_w} + \overline{V_x} + \overline{V_y} + V_z + \ldots)]^2$ is added to the energy function. Introduction of the $V_m$ translates to an additional active element in the system that implements the energy minimization process. The feedback matrix that connects the output of each amplifier to the input of all amplifiers is augmented for each inter-neuron by the coefficients of the equation $$V_u V_m + \lambda[V_m + (-1 + \overline{V_w} + \overline{V_x} + \overline{V_y} + V_z + \ldots)]^2.$$

Thus, to those skilled in the art to which the invention relates many changes in construction, embodiments and applications of the invention will suggest themselves without departing from the scope and spirit of the invention. The disclosures and the description herein, as stated initially, are purely illustrative and are not intended to be limiting in any sense.

What is claimed is:

1. A highly parallel circuit for developing N simultaneous output signals which minimize an energy function that is characterized by said output signals in terms of products of different ones of said output signals, including product terms of degree greater than two, comprising:
    a plurality of M amplifiers where M is a number that is greater than the number N by the number of terms in said energy function whose order is greater than two, where each of said amplifiers, designated by a unique pair of indices i and j, comprises an input port and an output port that develops an output signal $V_{ij}$; and
    a feedback conductance matrix connecting the output of each of said amplifiers to the input of each of said amplifiers, forming $M^2$ connections, with each of said connections being effected through a conductance $T_{ijkl}$;
    where each said conductance $T_{ijkl}$ connects the output of the amplifier designated by indices ij to the input of the amplifier designated by indices kl, spanning the range of indices i and j, with conductance values which are linear combinations of $\lambda_x$ and $\delta_z^y$ terms, where $\lambda_x$ are predetermined penalty constants identified by index x and $\delta_z^y$ is a function whose value is one when y=z, and zero otherwise, where y and z span the range of indices i, j, k and l.

2. The circuit of claim 1, further comprising an input matrix for injecting a predetermined current into each of said inputs of said amplifiers.

3. The apparatus of claim 2 wherein said input matrix is a combination of preselected input signals and a linear combination of $\lambda_x$ and $\delta_x^y$ terms, wherein said preselected input signals uniquely characterize the circuit's response to stimuli, $\lambda_x$ are preselected penalty constants and $\delta_z^y$ is a function in y and z whose value is one when y=z and zero otherwise.

4. The circuit of claim 1 wherein for each term in said energy function whose degree is greater than two, said M is increased by one and said feedback matrix is augmented by the coefficients of the equation $$V_u V_m + \lambda[V_m + (-1 + \overline{V_w} + \overline{V_x} + \ldots)]^2$$

when $V_u$, $V_w$, and $V_x$, are said amplifier output voltages included in that term of said energy function whose degree is greater than two, and $V_m$ is the amplifier output voltage of an additional amplifier included in said plurality of M amplifiers.

5. The circuit of claim 1 wherein for each term in said energy function of the form $V_u V_w V_x \ldots$ said M is increased by one and said feedback matrix is augmented by the coefficients of the equation $$V_u V_m + \lambda[V_m + (-1 + \overline{V_w} + \overline{V_x} + \ldots)]^2$$

where $V_u$, $V_w$, and $V_x$, are said amplifier output voltages included in that term of said energy function whose degree is greater than two, and $V_m$ is the amplifier output voltage of an additional amplifier included in said plurality of M amplifiers.

6. The circuit of claim 1 wherein for each term in said energy function of the form $$V_{AB} \pi \frac{\overline{V_{CA}}}{C},$$

said plurality of M amplifiers is increased by one amplifier developing an output voltage $V_{inA}$ and said feedback matrix is augmented with a term of the form $$\sum_{i,j,k,l} [\delta_i^j \delta_k^{in} + \lambda \delta_i^{in} \delta_k^i \delta_l^j + 2\lambda \delta_i^{in} \delta_l^j + \lambda \delta_l^j]$$

where $\lambda$ is a preselected penalty constant and $\delta$ is a function in the variables appearing as a subscript and a superscript of $\delta$, whose value is one when subscript is equal to the superscript and zero otherwise.

7. The circuit of claim 1 wherein for each term in said energy function of the form $$V_{AB} \pi \frac{\overline{V_{CD}}}{D},$$

said plurality of M amplifiers is increased by one amplifier developing an output voltage VCout and said feedback matrix is augmented with a term of the form $$\sum_{i,j,k,l} [\delta_k^j \delta_l^{out} + \lambda \, {}_k{}^j \delta_l^j \delta_l^j + 2\lambda \delta_k^i \delta_l^j + \lambda \delta_k^j]$$

where $\lambda$ is a preselected penalty constant and $\delta$ is a function in the variables appearing as a subscript and a superscript of $\delta$, whose value is one when subscript is equal to the superscript and zero otherwise.

8. Apparatus for solving a routing problem where there are N possible stopping points, where N is a number, there is a cost $C_{AB}$ associated with traveling from point A to point B, and the objective is to go from a starting point α to an endpoint ω with minimum overall attendant cost comprising:
- a plurality of $(N^2+2N)$ amplifiers, $V_{ij}$, where i is a variable assuming said N point designations and an additional "in" designation, and j is a variable assuming the said N point designations and an additional "out" designation, with j not equal to "out" when i is equal to "in"; and
- a feedback conductance matrix connecting the output of each of said amplifiers to the input of each of said amplifiers, forming $(N^2+N)^2$ connections, with each of said connections being effected through a conductance $T_{ijkl}$;
- where said feedback conductance matrix comprises conductances $T_{ijkl}$ connecting the output of amplifier ij to the input of amplifier kl with conductance values which are linear combinations of $\lambda_x$ and $\delta_z^y$ terms, where $\lambda_x$ are predetermined penalty constants identified by index x and $\delta_z^y$ is a function whose value is one when y=z, and zero otherwise where y and z span the range of indices i, j, k and l.

9. The apparatus of claim 8, further comprising an input matrix for inducing a predetermined current into each of said inputs of said amplifiers.

10. The apparatus of claim 9 wherein said current is related to said cost terms and to a linear combination of $\lambda_x$ and $\delta_z^y$ terms, where $\lambda_x$ are predetermined penalty constants and $\delta_z^l$ is a function in parameters z and y whose value is one when y=z, and zero otherwise, and where said z and y paramters take on a value from the set of said N point and said "in" and "out" designations.

11. The apparatus of claim 8 wherein the value of said $T_{ijkl}$ terms is related to $$T_{ijkl} = \lambda_1\delta_k^i + \lambda_2\delta_l^j + \lambda_3\delta_k^j\delta_l^{out} - \lambda_3\delta_k^j\delta_l^{out}\delta_j^\omega \\ + \lambda_6\delta_l^j\delta_k^{in} - \lambda_6\delta_l^j\delta_k^{in}\delta_j^\alpha + \lambda_{10}\delta_k\delta_l^j \\ + \lambda_{11}\delta_k^i\delta_l^j\delta_j^{out} + 2\lambda_{11}\delta_k^i\delta_l^j\delta_j^{out} + \lambda_{11}\delta_k^i \\ + \lambda_{12}\delta_l^{in}\delta_k^i\delta_l^j + 2\lambda_{12}\delta_l^{in}\delta_l^j + \lambda_{12}\delta_l^j].$$

* * * * *